Nov. 14, 1967     A. NEUMEIER     3,352,996
COLLAPSIBLE STUD WELDER COLLET
Filed Jan. 20, 1964     2 Sheets-Sheet 1
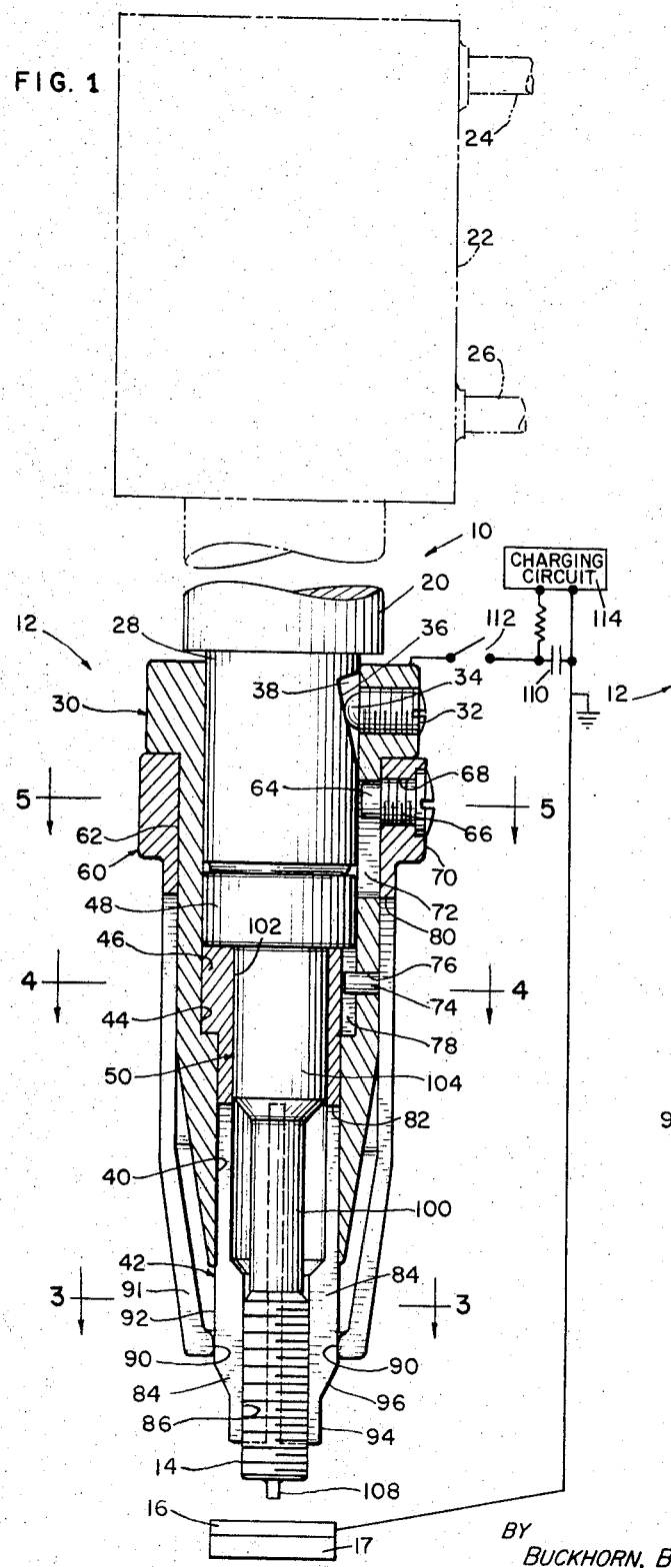
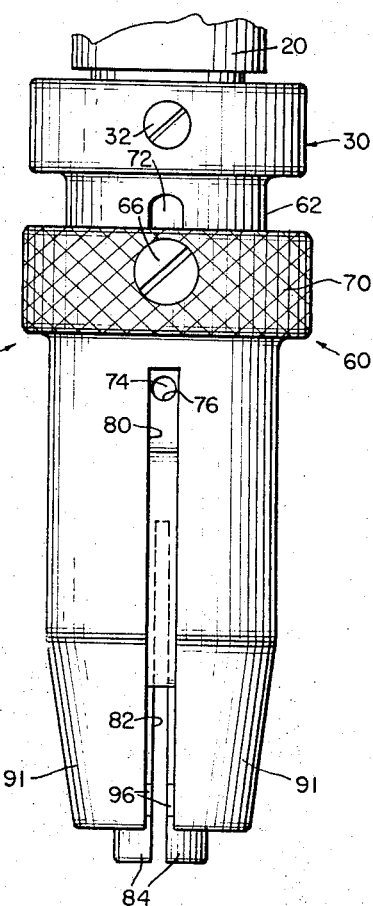
ALBERT NEUMEIER
INVENTOR
BY
BUCKHORN, BLORE, KLARQUIST & SPARKMAN
ATTORNEYS Nov. 14, 1967     A. NEUMEIER     3,352,996
COLLAPSIBLE STUD WELDER COLLET Filed Jan. 20, 1964     2 Sheets-Sheet 2

ALBERT NEUMEIER
INVENTOR
BY
BUCKHORN, BLORE, KLARQUIST & SPARKMAN
ATTORNEYS

United States Patent Office 3,352,996
Patented Nov. 14, 1967

3,352,996
COLLAPSIBLE STUD WELDER COLLET
Albert Neumeier, Milwaukie, Oreg., assignor to Omark Industries, Inc., Portland, Oreg., a corporation of Oregon
Filed Jan. 20, 1964, Ser. No. 338,987
11 Claims. (Cl. 219—98)

ABSTRACT OF THE DISCLOSURE

A weighted collet sleeve 60 is slidable along an adapter sleeve 30 connected to a spindle 20 of a welding machine between an upper position holding fingers 84 of a collet 46 in gripping engagement with a stud 14 and a lower position releasing the collet fingers 84. The collet sleeve 60 slides forwardly to its releasing position when the stud is moved into abutment with a workpiece 16, to release the collet before rebound of the collet occurs.

Description

Figure 3:
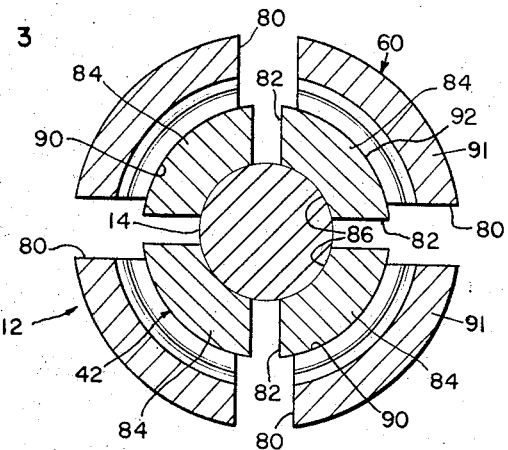

This invention relates to a stud welding machine and more particularly to a stud welder having a collapsible holder.

The most satisfactory high speed, capacitor discharge, stud welding machines known hitherto have been of the type having a collet having spring fingers always biased toward gripping engagement with the stud and driven with the stud rapidly toward a workpiece by a resilient driving mechanism during discharge of a capacitor circuit through the collet, the stud and the workpiece. One problem present in this type of machine has been that of firmly gripping the stud with the collet sufficiently strongly to provide good electrical contact between the collet and the stud but not so strongly that the stud is pulled back away from the workpiece by the collet during rebound of the collet from the workpiece occurring from the sharp impact of the stud with the workpiece at the end of the forward stroke of the collet. This has been a difficult problem in the prior art stud welding machines. Another problem in the prior art stud welding machines is that, with the fingers of the collet being always urged toward gripping positions, wear of the contacting surfaces of the fingers of the collet from rubbing by the studs occurs during rebound of the collet, and also this biasing of the collet fingers toward their gripping positions makes loading of the studs into the collet more difficult than would be desired. It would be desirable to provide a stud welding machine having a holder with strong gripping action with complete release of the stud by the holder immediately before rebound of the holder begins, and in which the holder is easily loaded.

An object of the invention is to provide a new and improved stud welding machine.

Another object of the invention is to provide a stud welder having a collapsible collet.

A further object of the invention is to provide a stud welder having a stud holder which clamps a stud tightly to provide good electrical contact therewith and is automatically released as a stud driven thereby is stopped by a workpiece so that during rebound of the holder it does not exert pull on the stud so that the weld is not damaged and, also, wear of the contacting surfaces of the collet is minimized.

Yet another object of the invention is to provide a holder for a stud which grips the stud tightly to provide excellent electrical contact therewith and which is releasable by inertia of an actuator thereof at the end of movement of the stud toward a workpiece as the holder is moved toward the workpiece by a resilient drive.

A still further object of the invention is to provide a stud welder including a collet having spring fingers biased toward open positions and held in closed positions gripping a stud by a sleeve until the stud is driven by the collet into engagement with a workpiece at which time the sleeve is moved by inertia relative to the collet to release the spring fingers of the collet so that rebound of the collet does not exert any force tending to pull the stud away from the workpiece.

The invention provides a stud welding machine including a stud holder driven by a resilient drive to rapidly move a stud toward a workpiece as a capacitor circuit is discharged through the stud and the workpiece. The holder makes good electrical contact with the stud and supplies the electrical current thereto. The holder also serves to release the stud just as movement of the stud toward the workpiece stops so that, during rebound of the holder from the impact of the stud with the workpiece, the holder does not pull the stud away from the workpiece. Preferably the holder includes a collet having spring fingers biased away from closed positions gripping the stud and a collet sleeve holding the spring fingers closed as the stud is moved toward the workpiece and movable by inertia to a collet releasing position permitting the spring fingers to move away from the stud as the stud and holder terminate their movement toward the workpiece.

Figure 4:
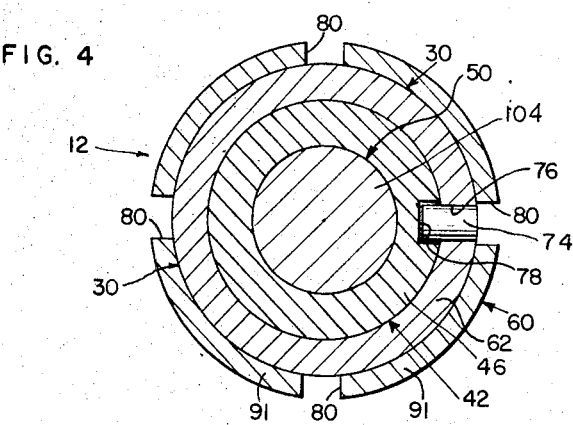
Figure 5:
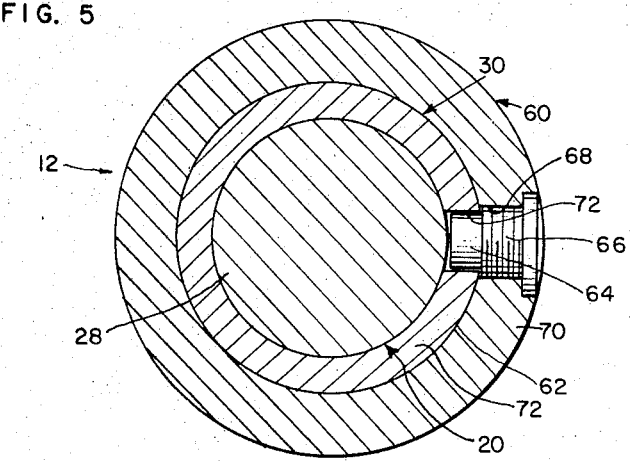

A complete understanding of the invention may be obtained from the following detailed description of a stud welding machine forming a specific embodiment thereof, when read in conjunction with the appended drawings, in which:

FIG. 1 is a fragmentary, partially sectional front elevation view of a stud welding machine forming one embodiment of the invention in a position holding a stud;

FIG. 2 is a fragmentary, front elevation view of the stud welding machine of FIG. 1 in a releasing position; and FIGS. 3, 4 and 5 are horizontal sectional views taken respectively substantially along lines 3—3, 4—4 and 5—5 of FIG. 1 on an enlarged scale, FIG. 3 being on a larger scale than FIGS. 4 and 5.

Referring now in detail to the drawings, a stud welding machine 10 includes a collet type holder 12 for moving a stud 14 toward a workpiece 16 held on fixed member 17 while supplying electric current to the stud and for completely releasing the stud as the forward movement of the stud toward the workpiece is stopped so that rebound of the holder does not pull the stud away from the workpiece. The stud welding machine also includes a spindle 20 driven by a resilient drive illustrated schematically in FIG. 1 as a pneumatic cylinder device 22 having supply conduits 24 and 26 at the top and bottom ends thereof. The spindle has a reduced lower end portion 28 to which an adapter sleeve 30 is secured by a setscrew 32 having a round end 34 engaging an inclined bottom surface 36 of a recess 38 in the spindle. The sleeve 30 has a bore 40 receiving a collet 42 and a counterbore 44 receiving a head 46 of the collet, and forces the collet upwardly, as viewed in FIG. 1, against a head 48 of a stop 50 to hold the stop 50 against the lower end of the spindle.

A collet sleeve or weighted actuator 60 is slidable on cylindrical portion 62 of the adapter sleeve between an upper, collet-closing position shown in FIG. 1 and a lower, collet-releasing position shown in FIG. 2, the limits of travel of the sleeve 60 being determined by a pin end 64 of a screw 66 threaded into tapped bore 68 in enlarged, knurled head 70 of the sleeve 60. The pin end 64 of the screw 68 projects into a splining slot 72 in the adapter sleeve 30. A pin 74 (FIG. 4) fitted tightly in bore 76 in the adapter sleeve 30 projects into slot 78 in the head 46 of the collet 42 to key the sleeve 30 and the collet together. Thus, the collet sleeve 60 is splined to the adapter sleeve 30 and the adapter sleeve 30 is keyed to the collet 42 so that the collet sleeve is held against rotation relative to the collet but is slidable along the collet and the adapter sleeve. The collet and the collet sleeve are held in this way in positions in which longitudinal slots 80 and 82 in the collet sleeve and collet, respectively, are aligned laterally with each other. If desired to increase the inertia of the collet sleeve, an annular weight (not shown) may be secured to the collet sleeve just below the head 70 thereof. The slot 78 extends to the top end of the collet 42 to permit the pin 74 to be moved into and out of the slot 78 for assembly and disassembly of the adapter sleeve 30 and collet, which assembly and disassembly operations are, of course, possible only when the holder 10 has been removed from the spindle 20.

The slots 82 (FIG. 3) are spaced equiangularly around the collet 42 to split the collet into four spring fingers 84. When the collet is in its closed or gripping condition as illustrated in FIG. 1, the inner, contact surfaces 86 of the four fingers 84 substantially define a cylindrical bore of substantially the same diameter as the exterior of the stud 14. The collet 42 is preferably composed of Phosphor bronze or other excellent spring material having high electrical conductivity. When the collet sleeve 60 is slid down to its lower, releasing position as shown in FIG. 2, inner, arcuate, round edge, cam projections 90 of spring fingers 91 of the sleeve 60 move off cylindrical portions 92 of the fingers 84 to positions adjacent reduced cylindrical portions 94 of the fingers 84 and the fingers 84 spring to their open positions completely releasing the stud. It will, of course, be understood that, when the fingers 84 are held in their gripping positions as shown in FIG. 1, the outer portions of the cylindrical portions 92 of the fingers 84 immediately adjacent the lower, tip end of the adapter sleeve 30 are spaced radially inwardly a few thousandths of an inch from the tip end of the adapter sleeve, this clearance being so slight that it is not feasible to show the clearance in the drawings. The lower, tip end of the adapter sleeve is engaged by and acts as a stop for the spring fingers 84 when the latter are in their releasing positions in which they are sprung radially outwardly somewhat from the gripping positions thereof. The thinner upper portions of the spring fingers 84 provide the spring action of the fingers 84, and bias the contact surfaces 86 of the fingers toward normal positions spaced even farther radially outwardly than the releasing positions thereof, which latter positions are, of course, determined by relative diameters of the bore 40 in the adapter sleeve and the cylindrical portions 92 of the fingers 84. The contact surfaces 86 and the portions 92 while designated as cylindrical are actually portions of cylinders only when the fingers 84 are in their gripping positions and are slightly frustoconical when in their releasing positions.

The fingers 91 are much stronger than the fingers 84 and control the positions of the fingers 84. The fingers 91 exert no gripping action on the adapter sleeve 30. The fingers 84 have frustoconical camming or blending surfaces 96 joining the reduced portions 94 and the larger, upwardly positioned, cylindrical portions 92 of the fingers 84. A reduced shank 100 of the stop 50 extends along the lower portion of counterbore 102 in the collet 42, and intermediate cylindrical portion 104 of the stop fits into the upper end of the counterbore 102. The reduced shank 100 is sufficiently small in diameter that clearance between the contact surfaces 86 of the fingers 84 and the shank is provided when the stop 50 engages the upper end of the stud 14.

The stud 14 has the well known central, reduced, pin-like projection 108 adapted to initiate the welding arc as the stud is moved toward engagement with the workpiece 16 during the welding stroke. Current is supplied to the stud through the collet 42 from a welding circuit illustrated schematically by a capacitor 110 and a switch 112 closable by a solenoid (not shown) in timed relationship with the operation of the resilient drive of the holder 12 toward the workpiece 16 as is well known in the stud welding art. A known charging circuit 114 charges the capacitor 110 after each welding operation.

In the operation of the stud welding machine, with the holder 12 in its retracted position and releasing condition as illustrated in FIG. 2 in which the spring fingers 84 are in their open, sprung apart positions, the operator inserts the stud 14 into the collet 42 and pushes the collet sleeve 60 upwardly to the collet closing position thereof as shown in FIG. 1. In this latter position of the collet sleeve, the collet sleeve fingers 91 press the collet fingers 84 tightly against the stud to provide good electrical contact therebetween and firm gripping of the stud by the collet fingers. The workpiece 16 is positioned on the fixed member 17. Then the switch 112 is closed and pneumatic cylinder device 20 is actuated to move the holder 12 with the stud rapidly toward the workpiece. This draws an arc between the workpiece and the projection 108 as the latter approaches the workpiece, and the projection 108 and lower end of the stud and the adjacent surface of the workpiece melt. Then the stud is moved against the workpiece with a sharp impact and stops. The stud stops the movement of the holder 12 except for the collet sleeve 60 which, by inertia, rapidly slides to its releasing position shown in FIG. 2. This releases the spring fingers 84, which immediately spring radially outwardly from the stud to release the stud. Then the holder 12 rebounds from the impact but has completely released the stud so that it is not pulled back by the rebound of the holder and there is no gripping of the stud by the inner, contact surfaces of the collet fingers 84 during rebound so that wear of the contact surfaces by the stud is minimized. The device 22 then is actuated to retract the holder for another operation after the workpiece and stud 14 welded thereto have been removed from the machine 10.

The holder 12 has been shown in the stud welding machine 10 which is of the initial gap type, but the holder 12 can also be employed in stud welding machines similar to the machine 10 but of the initial contact type. The holder 12 firmly grips the stud during the feed stroke to provide excellent low resistance electrical contact between the stud and the collet and is completely free of the prior art problems of pulling the stud from the workpiece and of being worn by the stud during rebound. In the holder 12, the collet is completely open for loading so that the stud can be inserted into the collet quickly and easily.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a stud welding machine,
a workpiece support,
holder means for holding a stud,
a resilient drive for moving the holder means rapidly toward the support to move a stud held by the holder means toward a workpiece held by the support with sufficient speed to cause rebound of the holder means from the support after movement of the stud toward the workpiece stops,
means for creating an electric current through the holder means, the stud and the workpiece as the holder means is driven toward the support,
and actuator means operable to actuate the holder means to grip the stud tightly while the holder means is moved toward the workpiece and operable by inertia after the stud has engaged the workpiece to re- lease the stud before the rebound of the holder means occurs.

2. In a stud welding machine,
a workpiece support,
holder means for holding a stud,
a resilient drive for moving the holder means rapidly toward the support to move a stud held by the holder means toward a workpiece held by the support with sufficient speed to cause rebound of the holder means from the support after movement of the stud toward the workpiece stops,
means for creating an electric current through the holder means, the stud and the workpiece as the holder means is driven toward the support,
and actuator means carried by the holder means and normally operable to actuate the holder means to grip the stud tightly while the holder means is moved toward the stud and movable by inertia as movement of the holder means toward the support is stopped to actuate the holder means to release the stud before rebound of the holder means occurs.

3. In a stud welding machine,
a workpiece support,
a collet having fingers for holding a stud and normally biased to releasing positions,
a resilient drive for moving the collet rapidly toward the support to move a stud held by the collet toward a workpiece held by the support with sufficient speed to cause rebound of the collet from the support after movement of the stud toward the workpiece stops,
means for creating an electric current through the collet, the stud and the workpiece as the holder means is driven toward the support,
and an actuator sleeve slidable by inertia from a retracted position holding the fingers of the collet in positions gripping the stud tightly while the collet is moved toward the stud to a releasing position permitting the fingers to release the stud before rebound of the collet occurs.

4. In a stud welding machine,
a workpiece support,
a collet having fingers movable between gripping positions holding a stud and releasing positions freeing the stud,
a resilient drive for moving the collet rapidly toward the support to move a stud held by the collet toward a workpiece held by the support with sufficient speed to cause rebound of the collet from the support after movement of the stud toward the workpiece stops,
means for creating an electric current through the collet, the stud and the workpiece as the holder means is driven toward the support,
and collet actuating means movable by the drive and movable relative to the collet by inertia from a retracted position holding the fingers of the collet in positions gripping the stud tightly while the collet is moved toward the stud to a releasing position permitting the fingers to release the stud before rebound of the collet occurs.

5. In a stud welding machine,
a workpiece support,
holder means for holding a stud,
means for moving the holder means rapidly toward the support to move a stud held by the holder means toward a workpiece held by the support,
means for creating an electric current through the holder means, the stud and the workpiece as the holder means is driven toward the support,
and a weighted actuator carried with and movable relative to the holder means for actuating the holder means to grip the stud tightly while the holder means is moved toward the stud and movable by inertia toward the support when movement of the holder means toward the support is stopped to release the stud before rebound of the holder means occurs.

6. In a stud welding machine,
a workpiece support,
a collet having fingers for holding a stud and normally biased to releasing positions,
spindle means carrying the collet,
a resilient drive for moving the spindle means rapidly toward the support to move a stud held by the collet toward a workpiece held by the support with sufficient speed to cause rebound of the collet from the support after movement of the stud toward the workpiece stops,
means for creating an electric current through the collet, the stud and the workpiece as the holder means is driven toward the support,
and an actuator sleeve slidable on the spindle means by inertia from a retracted position holding the fingers of the collet in position gripping the stud tightly while the holder means is moved toward the stud to a releasing position permitting the fingers to release the stud before rebound of the collet occurs.

7. In a collapsible welder collet,
a sleeve-like collet having a plurality of spring fingers of a predetermined strength having gripping portions provided with elongated, inner, gripping surfaces defining a cylindrical bore of a predetermined diameter when the fingers are moved radially inwardly to gripping positions from normal positions thereof,
an adapter sleeve holding therein the collet in a fixed position in which the gripping portions of the fingers of the collet are located in positions beyond the adapter sleeve,
the gripping portions of the fingers of the collet having exterior portions defining a cylinder of a predetermined diameter,
an inertia operated collet sleeve mounted slidably on the adapter sleeve and having spring fingers of substantially greater strength than that of the fingers of the collet and provided with inwardly projecting cams adapted to engage the exterior portions of the gripping portions of the fingers of the collet and hold the fingers of the collet in the gripping positions thereof when the collet sleeve is in a retracted position on the adapter sleeve and adapted to slide off the ends of the exterior portions of the gripping portions to release the spring fingers of the collet when the collet sleeve is slid to a releasing position,
means for moving the adapter sleeve, the collet sleeve and the collet axially thereof in a work stroke to move a stud held by the collet toward a workpiece,
means for creating an electrical potential between the collet and the workpiece to weld the stud to the workpiece,
means for keying the collet to the adapter sleeve,
and means for splining the collet sleeve to the adapter sleeve in a position in which the spring fingers of the collet sleeve are laterally aligned with the spring fingers of the collet.

8. In a collapsible welder collet,
a spindle,
an adapter sleeve fixed to an end of the spindle in a position extending therebeyond,
an inertia releasing collet sleeve slidable lengthwise on the adapter sleeve between predetermined limits and extending therebeyond,
a stop,
a collet on the stop and held by the adapter sleeve in a position extending through the collet sleeve,
means for supplying welding current to the collet,
the collet having spring fingers urged outwardly away from gripping positions, the collet sleeve having spring fingers movable between first positions forcing the fingers of the collet to gripping positions when the collet sleeve is in a retracted position on the adapter sleeve and second positions releasing the spring fingers of the collet when the collet sleeve is in an extended position on the adapter sleeve, the collet sleeve being movable by inertia when forward movement of a stud by the collet sleeve is stopped.

9. In a collapsible welder collet, a spindle, an adapter sleeve fixed to an end of the spindle in a position extending therebeyond, a weighted, inertia releasing collet sleeve slidable lengthwise on the adapter sleeve from a retracted position on the adapter sleeve to an extended position on the adapter sleeve and extending therebeyond, a stop, and a collet on the stop and held by the adapter sleeve in a position extending through the collet sleeve, the collet having spring fingers urged outwardly away from gripping positions, the collet sleeve having spring fingers movable between first positions forcing the fingers of the collet to gripping positions when the collet sleeve is in the retracted position thereof on the adapter sleeve and second positions releasing the spring fingers of the collet when the collet sleeve is in the extended position thereof on the adapter sleeve, the collet sleeve being movable by inertia to the extended position thereof when forward movement of a stud by the collet is stopped.

10. In a collapsible welder collet, a collet of electrically conductive material and having a sleeve portion and a plurality of spring fingers extending from the sleeve portion and biased radially outwardly of the collet and movable radially inwardly to gripping positions, the spring fingers having inner faces defining a substantially cylindrical bore when the fingers are in the gripping positions and having reduced exterior free end portions and cam portions extending from the exterior free end portions toward the sleeve portion, a spindle, a stop extending from an end of the spindle into and through the sleeve portion of the collet, an adapter sleeve fixed to the spindle and holding the sleeve portion of the collet and the stop fixedly relative to the spindle, means for supplying welding current through the collet, and an inertia releasing collet sleeve slidable on the adapter sleeve and having fingers provided with projections extending inwardly and adapted to engage the cam portions when the collet sleeve is in a first position on the adapter sleeve and to engage the exterior free end portions of the fingers of the collet when the collet sleeve is in a second position on the adapter sleeve extending farther from said end of the spindle than when the collet sleeve is in said first position thereof.

11. In a collapsible welder collet, a collet of electrically conductive material and having a sleeve portion provided wtih an enlarged head having a keying slot, means for supplying a welding current to the collet, the collet also having a plurality of spring fingers extending from the sleeve portion and biased radially outwardly of the collet and movable radially inwardly to gripping positions, the spring fingers having inner faces defining a substantially cylindrical bore when the fingers are in the gripping positions and having reduced exterior free end portions and larger cylindrical portions extending from the exterior free end portions toward the sleeve portion, a spindle, a stop having a head and also having a shank extending from that end of the spindle into and through the sleeve portion of the collet, an adapter sleeve having a bore and a counterbore receiving the head of the collet and the head of the stop, the adapter sleeve also having a splining slot extending along a portion thereof, means detachably locking the adapter sleeve on the spindle in a position holding the head of the collet against the head of the stop and the head of the stop against one end of the spindle, an inertia releasing collet sleeve slidable on the adapter sleeve and having spring fingers provided with projections extending inwardly and adapted to engage the cam portions when the collet sleeve is in a first position on the adapter sleeve and to engage the exterior free end portions of the fingers of the collet when the collet sleeve is in a second position on the adapter sleeve extending farther from said end of the spindle than when the collet sleeve is in said first position thereof, the collet sleeve also having a tapped transverse bore at the end thereof opposite the spring fingers thereof, a keying member carried by the adapter sleeve and projecting into the slot in the head of the collet, and a splining screw screwed into the tapped bore in the collet sleeve and having an end portion projecting into this splining slot in the adapter sleeve to spline the collet sleeve to the adapter sleeve in a position in which the fingers of the collet sleeve are laterally aligned with the spring fingers of the collet.

References Cited
UNITED STATES PATENTS

| | | | |
|---|---|---|---|
| 2,475,907 | 7/1949 | Martin | 219—98 |
| 2,510,620 | 6/1950 | Craven | 219—98 |
| 3,293,402 | 12/1966 | Graham | 219—98 |

RICHARD M. WOOD, *Primary Examiner.*

R. F. STAUBLY, *Assistant Examiner.*